(12) United States Patent
Makai et al.

(10) Patent No.: US 7,949,053 B2
(45) Date of Patent: May 24, 2011

(54) METHOD AND ASSEMBLY FOR VIDEO ENCODING, THE VIDEO ENCODING INCLUDING TEXTURE ANALYSIS AND TEXTURE SYNTHESIS, AND CORRESPONDING COMPUTER PROGRAM AND CORRESPONDING COMPUTER-READABLE STORAGE MEDIUM

(75) Inventors: Bela Makai, Berlin (DE); Patrick Ndjiki-Nya, Berlin (DE); Heiko Schwarz, Berlin (DE); Aljoscha Smolic, Berlin (DE); Thomas Wiegand, Berlin (DE)

(73) Assignee: Fraunhofer-Gesellschaft Zur Foerderung Der Angewandten Forschung E.V (DE)

( * ) Notice: Subject to any disclaimer, the term of this patent is extended or adjusted under 35 U.S.C. 154(b) by 1678 days.

(21) Appl. No.: 11/208,103

(22) Filed: Aug. 19, 2005

(65) Prior Publication Data

US 2006/0039617 A1    Feb. 23, 2006

Related U.S. Application Data

(63) Continuation of application No. PCT/EP2004/001939, filed on Feb. 26, 2004.

(30) Foreign Application Priority Data

Feb. 28, 2003 (DE) .................................. 103 10 023

(51) Int. Cl.
*H04N 7/12* (2006.01)
(52) U.S. Cl. ................................. 375/240.26
(58) Field of Classification Search .. 375/240.1–240.29; 382/232; *H04B 1/66*
See application file for complete search history.

(56) References Cited

U.S. PATENT DOCUMENTS

| | | | | |
|---|---|---|---|---|
| 5,533,140 | A * | 7/1996 | Sirat et al. | 382/108 |
| 6,044,168 | A * | 3/2000 | Tuceryan et al. | 382/118 |
| 6,236,757 | B1 | 5/2001 | Zeng et al. | 382/240 |
| 6,593,925 | B1 * | 7/2003 | Hakura et al. | 345/426 |
| 6,810,086 | B1 * | 10/2004 | Puri et al. | 375/240.29 |

(Continued)

FOREIGN PATENT DOCUMENTS

EP    0 225 729    11/1986

(Continued)

OTHER PUBLICATIONS

Office Action dated Jul. 9, 2008 for related German Application No. 103 10 023.87, English Translation.

(Continued)

*Primary Examiner* — Tung Vo
(74) *Attorney, Agent, or Firm* — Thomas, Kayden, Horstemeyer & Risley, LLP.

(57) ABSTRACT

The invention relates to a method and assembly for video coding comprising a texture analysis, texture synthesis, corresponding computer program and a computer-readable recording medium. Said invention can be used, in particular for reducing a data rate during a video data transmission. An analysis of video scene texture by an encoder is performed in such a way that synthesized texture areas are determined. The video scene coding is carried out with the aid of data for said synthesized texture areas. Information on the texture of said areas, metadata used for describing the determined areas and the synthesized texture are generated. Coded data and metadata are evaluated by a decoder in such a way that the video scenes are reconstructed by synthetically generated textures by means of evaluation of metadata for determined areas.

45 Claims, 3 Drawing Sheets

U.S. PATENT DOCUMENTS 6,947,045 B1 * 9/2005 Ostermann et al. ............ 345/473
7,236,520 B2 * 6/2007 Kim et al. ................ 375/240.01

FOREIGN PATENT DOCUMENTS

EP 0 757 334 7/1996

OTHER PUBLICATIONS

Song Yee Yoon and Edward H. Adelson; Subband texture Synthesis for Image Coding; Department of Brain and Cognitive Sciences; Massachusetts Institute of Technology, Cambridge, MA.
Office Action dated Apr. 17, 2008 in related European Application No. 05 022 899.8-2218, English Translation.
Document by Aljoscha Smolic, et al., entitled "Long-Term Global Motion Estimation and Its Application for Sprite Coding, Content Description, and Segmentation", printed in IEEE Transactions on Circuits and Systems for Video Technology, vol. 9, No. 8, Dec. 1999.
EPO International Search Report dated May 29, 2007.
Ndjiki-Nya P et al: "Improved H.264/AVC coding using texture analysis and synthesis", 2003 Piscataway, NJ, USA, IEEE, USA, Sep. 14, 2003, Seiten III-849, XP002286886, ISBN: 0-7803-7750-8 *das ganze Dokument*.
Yoon S Y et al: "Subband texture synthesis for image coding", Proc. SPIE—INT. SOC. OPT. ENG. (USA), Proceedings of the SPIE—The International Society for Optical Engineering, 1998, SPIE—INT. SOC. OPT. ENG, USA, Bd. 3299, Jan. 1998, Seiten 489-497, XP002286887, ISSN: 0277-786X, Kap. 2, "Texture Synthesis and Analysis" *Seite 490-Seite 491*.
Malki J et al: "Region queries without segmentation for image retrieval by content", 1999, Berlin, Germany, Springer-Verlag, German, Jun. 2, 1999, Seiten 115-122, XP002286888, ISBN: 3-540-66079-8, Kap. 2, "Multiresolution Quadtrees" *Abbildung 1*.
ISO/IEC JTC 1/SC 29/WG 11, ISO/IEC FDIS 15938-3:2001 (E), 187 pages, Jul. 20, 2001.
ISO/IEC JTC 1/SC 29/WG 11, Coding of Moving Pictures and Associated Audio Information, 92 pages, Jul. 2001.
"Region Queries without Segmentation for Image Retrieval by Content", by Jamal Malki et al., 8 pages.
"Robust Global Motion Estimation Using a Simplified M-Estimator Approach" by Smolie et al., 4 pages.
A Texture Replacement Method at the Encoder for Bit-Rate Reduction of Compressed Video, by Dumitras, et al., pp. 163-175.
"Improved H.264/AVC Coding Using Texture Analysis and Synthesis" by Ndjiki-Nya et al., 4 pages.
Editor's Proposed Draft Text Modifications for Joint Video-Specification (ITU-T Rec. H.264, ISO/IEC 14496-10 AVC), Geneva modifications draft 37, pp. i-xxvi and 1-202.
"Subband Texture Synthesis for Image Coding" by Song Yee Yoon et al., pp. 489-497.

* cited by examiner

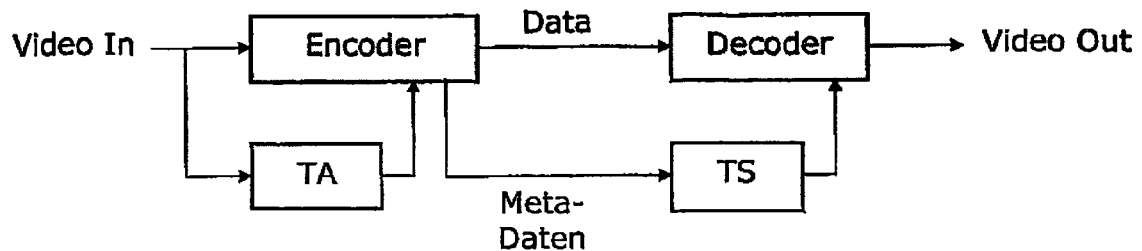
Figur 1
Figur 2
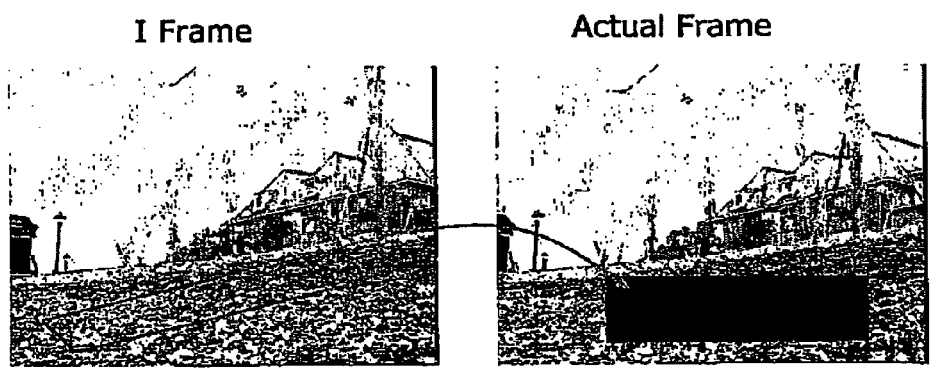
Figur 3

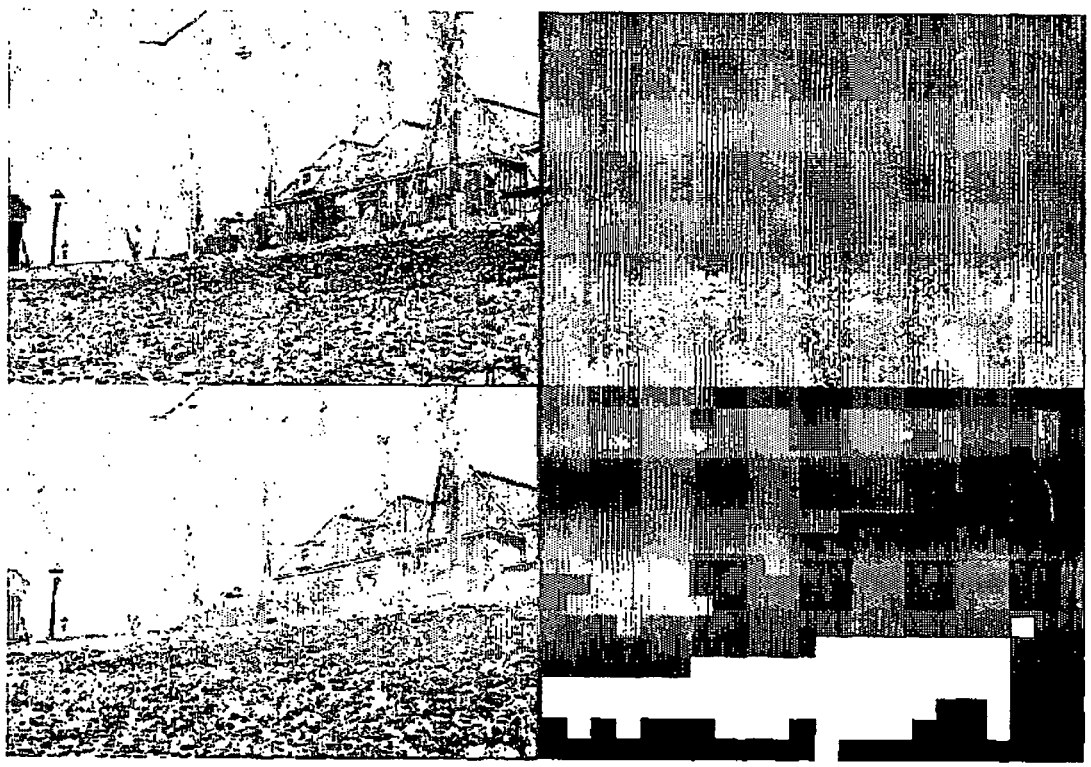
Figur 4 (Fig. 4a: oben links, Fig. 4b: unten links,
Fig. 4c: oben rechts, Fig. 4d: unten rechts)

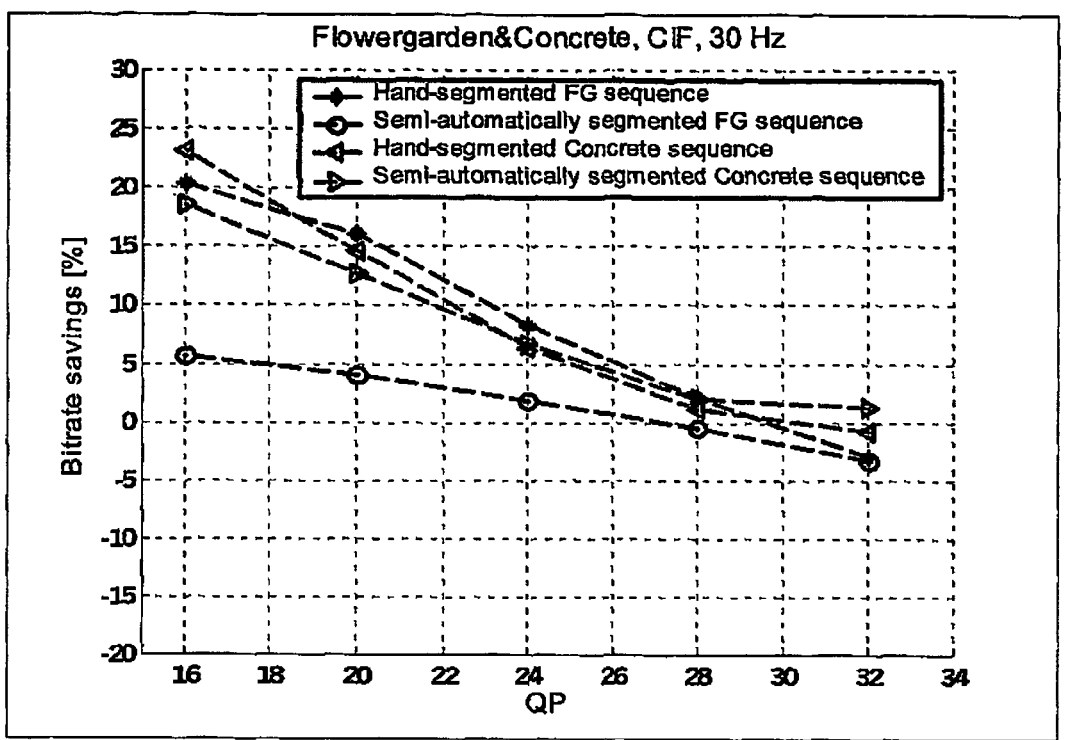
Figur 5

METHOD AND ASSEMBLY FOR VIDEO ENCODING, THE VIDEO ENCODING INCLUDING TEXTURE ANALYSIS AND TEXTURE SYNTHESIS, AND CORRESPONDING COMPUTER PROGRAM AND CORRESPONDING COMPUTER-READABLE STORAGE MEDIUM

CROSS-REFERENCE TO RELATED APPLICATION

This application is a continuation of copending International Application No. PCT/EP2004/001939, filed Feb. 26, 2004, which designated all PCT States, and was not published in English and is incorporated herein by reference in its entirety.

BACKGROUND OF THE INVENTION

1. Field of the Invention

The invention relates to a method and an assembly for video encoding, the video encoding including texture analysis and texture synthesis, and to a corresponding computer program and a corresponding computer-readable storage medium. In particular, the invention is applicable for reducing the bitrate in transmitting video data.

2. Description of Prior Art

Many video scenes contain typical textures such as water, grass, trees, clouds, sand, etc. These textures are typically rich in detail and therefore very expensive to code. However, exact reconstruction of these textures may be considered unimportant if they are depicted at a low local resolution. It is therefore unnecessary to first perform a computing-intense encoding of such texture areas, to transmit the resulting (large) amount of data, and to finally reconstruct the texture on the basis of MSE (mean squared error). The viewer only needs to be able to recognize the depicted detail-irrelevant texture, which is often not the case even with the reconstruction thus performed if a pre-filter is employed, since the texture is corrupted thereby.

SUMMARY OF THE INVENTION

Therefore, it is the object of the invention to provide a method and an assembly for video encoding, the video encoding including texture analysis and texture synthesis, and to a corresponding computer program and a corresponding computer-readable storage medium, which avoid the above-mentioned disadvantages of the known solutions and, in particular, enable reproduction of textures without any loss in visual quality while reducing the video data to be transmitted.

In accordance with a first aspect, the invention provides a method for video encoding, the method including the steps of:

performing a texture analysis of video scenes to identify areas of synthesizable textures;

encoding the video scenes and generating meta data for describing the areas identified and for describing the synthesizable textures using information on identified areas of synthesizable textures, and information on the textures of these areas; and ensuring temporal consistency of recognizing synthesizable textures in a sequence of frames by means of a texture catalogue, by storing the synthesizable textures of the identified areas of synthesizable textures in a first frame of the sequence in the texture catalogue in order to initialize same;

comparing the synthesizable textures of the identified areas of synthesizable textures in the following frames of the sequence with the synthesizable textures stored in the texture catalogue;

in the event of a match, assigning the respective synthesizable texture of an identified area of synthesizable texture among the following frames of the sequence to the respective synthesizable texture stored in the texture catalogue; and in the event of no match, storing the respective synthesizable texture of an identified area of synthesizable texture among the following frames of the sequence in the texture catalogue.

In accordance with a second aspect, the invention provides an apparatus for video encoding, having:

an analyzer for performing a texture analysis of video scenes to identify areas of synthesizable textures;

an encoder for encoding the video scenes and a generator for generating meta data for describing the areas identified and for describing the synthesizable textures using information on identified areas of synthesizable textures, and information on the textures of these areas; and a unit for ensuring temporal consistency of recognizing synthesizable textures in a sequence of frames by means of a texture catalogue, by storing the synthesizable textures of the identified areas of synthesizable textures in a first frame of the sequence in the texture catalogue in order to initialize same;

comparing the synthesizable textures of the identified areas of synthesizable textures in the following frames of the sequence with the synthesizable textures stored in the texture catalogue;

in the event of a match, assigning the respective synthesizable texture of an identified area of synthesizable texture among the following frames of the sequence to the respective synthesizable texture stored in the texture catalogue; and in the event of no match, storing the respective synthesizable texture of an identified area of synthesizable texture among the following frames of the sequence in the texture catalogue.

In accordance with a third aspect, the invention provides a computer program enabling a computer, once it has been loaded into the computer's memory, to perform a method for video encoding, the method including the steps of:

performing a texture analysis of video scenes to identify areas of synthesizable textures;

encoding the video scenes and generating meta data for describing the areas identified and for describing the synthesizable textures using information on identified areas of synthesizable textures, and information on the textures of these areas; and ensuring temporal consistency of recognizing synthesizable textures in a sequence of frames by means of a texture catalogue, by storing the synthesizable textures of the identified areas of synthesizable textures in a first frame of the sequence in the texture catalogue in order to initialize same;

comparing the synthesizable textures of the identified areas of synthesizable textures in the following frames of the sequence with the synthesizable textures stored in the texture catalogue;

in the event of a match, assigning the respective synthesizable texture of an identified area of synthesizable texture among the following frames of the sequence to the respective synthesizable texture stored in the texture catalogue; and in the event of no match, storing the respective synthesizable texture of an identified area of synthesizable texture among the following frames of the sequence in the texture catalogue.

In accordance with a fourth aspect, the invention provides a computer-readable storage medium having a program stored thereon which enables the computer, once it has been loaded into the computer's memory, to perform a method for video encoding, the method including the steps of:

performing a texture analysis of video scenes to identify areas of synthesizable textures;

encoding the video scenes and generating meta data for describing the areas identified and for describing the synthesizable textures using information on identified areas of synthesizable textures, and information on the textures of these areas; and ensuring temporal consistency of recognizing synthesizable textures in a sequence of frames by means of a texture catalogue, by storing the synthesizable textures of the identified areas of synthesizable textures in a first frame of the sequence in the texture catalogue in order to initialize same;

comparing the synthesizable textures of the identified areas of synthesizable textures in the following frames of the sequence with the synthesizable textures stored in the texture catalogue;

in the event of a match, assigning the respective synthesizable texture of an identified area of synthesizable texture among the following frames of the sequence to the respective synthesizable texture stored in the texture catalogue; and in the event of no match, storing the respective synthesizable texture of an identified area of synthesizable texture among the following frames of the sequence in the texture catalogue.

In accordance with a fifth aspect, the invention provides a method for video encoding, the method including the steps of:

performing a texture analysis of video scenes to identify areas of synthesizable textures;

encoding the video scenes and generating meta data for describing the areas identified and for describing the synthesizable textures using information on identified areas of synthesizable textures, and information on the textures of these areas, the step of generating the meta data comprising the step of estimating motion parameters describing a warping so as to adapt synthesizable areas in frames of a Group of Frames to corresponding texture areas in first or last frames of this group by means of the warping, the motion parameters being part of the meta data.

In accordance with a sixth aspect, the invention provides a method for video decoding, the method including the steps of:

assessing encoded data of video scenes and meta data for describing identified areas of synthesizable textures in the video scenes and for describing the synthesizable textures of these areas; and reconstructing the video scenes by synthetically generating synthetically generated textures for the areas identified, wherein the meta data comprise motion parameters describing a warping so as to adapt synthesizable areas in frames of a Group of Frames to corresponding texture areas in first or last frames of this group by means of the warping, and wherein the step of reconstructing comprises the step of warping the corresponding texture areas in the first or last frames of the group in the direction of the adapted synthesizable areas in the frames of the Group of Frames using the motion parameters.

In accordance with a seventh aspect, the invention provides an assembly for video encoding, having:

an analyzer for performing a texture analysis of video scenes to identify areas of synthesizable textures;

an encoder for encoding the video scenes and a generator for generating meta data for describing the areas identified and for describing the synthesizable textures using information on identified areas of synthesizable textures, and information on the textures of these areas; and the generator for generating the meta data being configured to estimate motion parameters describing a warping so as to adapt synthesizable areas in frames of a Group of Frames to corresponding texture areas in first or last frames of this group by means of the warping, the motion parameters being part of the meta data.

In accordance with an eighth aspect, the invention provides an assembly for video decoding, having:

an assessor for assessing encoded data of video scenes and meta data for describing identified areas of synthesizable textures in the video scenes and for describing the synthesizable textures of these areas; and a reconstructor for reconstructing the video scenes by synthetically generating synthetically generated textures for the areas identified, wherein the meta data comprise motion parameters describing a warping so as to adapt synthesizable areas in frames of a Group of Frames to corresponding texture areas in first or last frames of this group by means of the warping, and wherein the reconstructor is configured to warp the corresponding texture areas in the first or last frames of the group in the direction of the adapted synthesizable areas in the frames of the Group of Frames using the motion parameters.

In accordance with a ninth aspect, the invention provides a computer program enabling a computer, once it has been loaded into the computer's memory, to perform a method for video encoding, comprising:

performing a texture analysis of video scenes to identify areas of synthesizable textures;

encoding the video scenes and generating meta data for describing the areas identified and for describing the synthesizable textures using information on identified areas of synthesizable textures, and information on the textures of these areas, the step of generating the meta data comprising the step of estimating motion parameters describing a warping so as to adapt synthesizable areas in frames of a Group of Frames to corresponding texture areas in first or last frames of this group by means of the warping, the motion parameters being part of the meta data.

In accordance with a tenth aspect, the invention provides a computer program enabling a computer, once it has been loaded into the computer's memory, to perform a method for video decoding, comprising:

assessing encoded data of video scenes and meta data for describing identified areas of synthesizable textures in the video scenes and for describing the synthesizable textures of these areas; and reconstructing the video scenes by synthetically generating synthetically generated textures for the areas identified, wherein the meta data comprise motion parameters describing a warping so as to adapt synthesizable areas in frames of a Group of Frames to corresponding texture areas in first or last frames of this group by means of the warping, and wherein the step of reconstructing comprises the step of warping the corresponding texture areas in the first or last frames of the group in the direction of the adapted synthesizable areas in the frames of the Group of Frames using the motion parameters.

In accordance with an eleventh aspect, the invention provides a computer-readable storage medium having a program stored thereon which enables the computer, once it has been loaded into the computer's memory, to perform a method for video encoding, comprising:

performing a texture analysis of video scenes to identify areas of synthesizable textures;

encoding the video scenes and generating meta data for describing the areas identified and for describing the synthesizable textures using information on identified areas of synthesizable textures, and information on the textures of these areas, the step of generating the meta data comprising the step of estimating motion parameters describing a warping so as to adapt synthesizable areas in frames of a Group of Frames to corresponding texture areas in first or last frames of this group by means of the warping, the motion parameters being part of the meta data.

In accordance with a twelfth aspect, the invention provides a computer-readable storage medium having a program stored thereon which enables the computer, once it has been loaded into the computer's memory, to perform a method for video decoding, comprising:

assessing encoded data of video scenes and meta data for describing identified areas of synthesizable textures in the video scenes and for describing the synthesizable textures of these areas; and reconstructing the video scenes by synthetically generating synthetically generated textures for the areas identified, wherein the meta data comprise motion parameters describing a warping so as to adapt synthesizable areas in frames of a Group of Frames to corresponding texture areas in first or last frames of this group by means of the warping, and wherein the step of reconstructing comprises the step of warping the corresponding texture areas in the first or last frames of the group in the direction of the adapted synthesizable areas in the frames of the Group of Frames using the motion parameters.

A particular advantage of the method for video encoding, the video encoding including texture analysis and texture synthesis, is that the bitrate of the video data to be transmitted is reduced by performing, at the encoder side, a texture analysis of video scenes for determining areas of synthesizable textures, by encoding the video scenes and generating meta data for describing the areas identified and for describing the synthesizable textures using information on identified areas of synthesizable textures and information on the texture of these areas, and by assessing, at the decoder side, encoded data and meta data, and by reconstructing the video scenes by synthetically generating textures for areas identified by assessing the meta data.

Provision is made, in a preferred embodiment of the inventive method, for areas of synthesizable textures to be identified by split and merge segmentation, frames being subdivided into subframes (blocks) using a multi-resolution quadtree. It has proved advantageous to break off the subdivision of a block (starting block) if the subblocks resulting from the next subdivision step have similar color and/or texture properties as the starting block, or if the size of blocks of the latest subdivision step falls short of a predefined value. In addition, it is advantageous that blocks, the subdividing of which has been broken off due to similar color and/or texture properties, be marked as homogeneous blocks, and that the blocks which differ from the homogeneous blocks once the subdividing of the frame has been completed be marked as non-classifiable blocks. For reducing the number of blocks one embodiment provides for a similarity assessment to be performed for the homogeneous blocks after the subdivision of a frame, and for similar blocks to be combined into synthesizable areas. In a special embodiment of the inventive method, provision is made for the similarity of blocks to be assessed on the basis of the MPEG-7 descriptors "Edge Histogram" texture descriptor (EH) and/or "SCalable Color" descriptor (SCC).

Another preferred embodiment provides for identified areas of synthesizable textures of a frame to be matched with areas of synthesizable textures of preceding frames of the video sequence.

What is also advantageous is to code the first and last frame (the so-called key frames) of a "Group of Frames" (GoF) on the basis of an MSE-based method, and to partially synthesize intervening B frames with identified synthesizable areas. A further preferred embodiment of the inventive method provides for the temporal consistency of the recognition of synthesizable textures of a Group of Frames (GoF) to be ensured by means of a texture catalogue.

Another preferred embodiment provides for synthesizable areas in the partially synthesized frames to be adapted to corresponding texture areas in the key frames by adequate warping. In particular, it is envisaged that the warping be performed by means of a planar perspective motion model described by the following equations:

$$x'=[(a_1+a_3x+a_4y)/(1+a_7x+a_8y)]+x,$$

$$y'=[(a_2+a_5x+a_6y)/(1+a_7x+a_8y)]+y,$$

wherein (x, y) represent the coordinates of the starting point, (x', y') represent the transformed coordinates of the starting point, and $a_1, \ldots, a_8$ represent model parameters.

The results achieved with texture synthesis are particularly good if the warping causes the texture of the first or last frame of the current GoF to be warped in the direction of the synthesizable texture area identified, each such texture area being associated a motion parameter set and a control parameter, the control parameter indicating whether the first or the last frame of a GoF is used for texture synthesis. Herefor, what is provided for, specifically, is that for texture synthesis, that frame of a GoF is used for which a smaller differential signal is identified between the synthesized and the original texture region.

A further preferred embodiment of the inventive method for video encoding envisages that one segmentation mask, one motion parameter set and/or one control parameter be transmitted per texture area as meta data of areas having synthesizable textures.

In addition, it has proven advantageous to treat all macroblocks belonging to a synthesizable texture as skipped macroblocks when decoding.

An assembly in accordance with the invention comprises at least one chip and/or processor set up such that a method for video encoding, the video encoding including texture analysis and texture synthesis, may be performed, one element being arranged to perform a method for video encoding, comprising:

performing, at the encoder side, a texture analysis of video scenes for determining areas of synthesizable textures, encoding the video scenes and generating meta data for describing the areas identified and for describing the synthesizable textures using information on identified areas of synthesizable textures and information on the texture of these areas, and assessing, at the decoder side, encoded data and meta data, and reconstructing the video scenes by synthetically generating textures by assessing the meta data for areas identified.

A preferred embodiment of the inventive assembly envisages that the assembly comprise a video encoder, a texture analyzer (TA), a video decoder and a texture synthesizer (TS), the video encoder and the texture analyzer (TA) each having a video input, and the video decoder having a video output, the output of the texture analyzer (TA) being connected to a second input of the video encoder, and the output of the video encoder being connected to the input of the video decoder, and a second output of the video encoder being additionally connected to the input of the texture synthesizer (TS).

It has proven advantageous to employ, for performing the inventive video encoding, a computer program which enables a computer, once it has been loaded into the computer's memory, to perform a method for video encoding, the video encoding including texture analysis and texture synthesis, the computer program including program code for performing a method for video encoding, comprising:

performing, at the encoder side, a texture analysis of video scenes for determining areas of synthesizable textures, encoding the video scenes and generating meta data for describing the areas identified and for describing the synthesizable texture using information on identified areas of synthesizable textures and information on the texture of these areas, and assessing, at the decoder side, encoded data and meta data, and reconstructing the video scenes by synthetically generating textures by assessing the meta data for areas identified.

Alternatively, it may prove advantageous to use a computer-readable storage medium having a program stored thereon which enables a computer, once it has been loaded into the computer's memory, to perform a method for video encoding, the video encoding including texture analysis and texture synthesis, the computer program including program code for performing a method for video encoding, comprising:

performing, at the encoder side, a texture analysis of video scenes for determining areas of synthesizable textures, encoding the video scenes and generating meta data for describing the areas identified and for describing the synthesizable texture using information on identified areas of synthesizable textures and information on the texture of these areas, and assessing, at the decoder side, encoded data and meta data, and reconstructing the video scenes by synthetically generating textures by assessing the meta data for areas identified.

BRIEF DESCRIPTION OF THE DRAWINGS

With reference to the figures of the drawings, the invention will be explained below in more detail by means of an embodiment, wherein:

FIG. 1 depicts video encoding using a texture analyzer (TA) and a texture synthesizer (TS);

FIG. 2 shows a segmented single frame after the splitting stage (left-hand side) and after the merging stage (right-hand side);

FIG. 3 shows a warping of a texture area of the reference frame in the direction of the image area to be filled in the current frame;

FIG. 4 shows encoding results for the "Flowergarden" test sequence;
  a) top left: original frame (frame no. 6 of "Flowergarden" sequence)
  b) bottom left: decoded frame with synthesized texture regions;
  c) top right: differential signal (amplification factor 3)
  d) bottom right: conservative motion-compensated mask;

FIG. 5 bitrate savings in dependence on the quantization parameter QP.

DESCRIPTION OF PREFERRED EMBODIMENTS

The embodiment to be described below is based on the approach of realizing improved reproduction of textures by performing transmitting-end texture analysis and decoder-end texture synthesis by employing the inventive method for predecoding (cf. FIG. 1).

The texture analyzer identifies detail-irrelevant texture regions, generates corresponding coarse masks and signalizes them to the decoder as side information for the texture synthesizer. The latter replaces the identified textures by synthetically generated textures while exploiting the side information.

This procedure is based on the findings that for the identified detail-irrelevant textures, common objective quality criteria such as the mean squared error (MSE) are not suitable for efficient encoding, since under certain circumstances, irrelevant details may be transmitted and reconstructed. Our studies have shown that an MPEG-7 similarity measure is often sufficient for sensing the quality of reconstructed, detail-irrelevant textures (cf. ISO/IEC JTC1/SC29/WG11/N4358: "Text of ISO/IEC 15938-3/FDIS Informationstechnology—Multimedia content description interface—Part 3 Visual", Sydney, Australia, July 2001; ISO/IEC JTC1/SC29/WG11/N4362: "MPEG-7 Visual part of experimentation Model Version 11.0", Sydney, Australia, July 2001). The use of MPEG-7 similarity criteria results in that the reconstructed textures may have details different from those of the original texture. These differences are hardly perceivable if the local resolution of the textures is retained after the reconstruction, and they are far less disturbing than the corresponding artifacts occurring when encoding the differential signal at a bitrate corresponding to the side information.

The algorithms used for transmitter-end texture analysis and for receiver-end texture synthesis as well as system integration into an H.264/AVC codec will be described below.

Encoder-Side Texture Analysis

In texture analysis, a split and merge segmentation is performed for each frame of a sequence. In a first step (stage of subdivision, or splitting stage), each frame is subdivided into blocks, using a multi-resolution quadtree, and analyzed (cf. J. Malki et al.: "Region Queries without Segmentation for Frame Retrieval by Content", VISUAL'99, pp. 115-122, 1999.). The multi-resolution quadtree includes several levels, the first one (level 0) corresponding to the original frame. The number of blocks on the Lth level is $2^{2L}$. Each block on level (L−1) is divided up, on the next level up (level L), into 4 blocks, so that the number of blocks of a frame always remains the same horizontally and vertically (e.g. 4 blocks horizontally and vertically on the second level (L=2)).

A block on level (L−1) contains a homogeneous texture if its four subblocks on the Lth level have similar color and/or texture properties as does the block itself. Here, the similarity is determined by corresponding MPEG-7 descriptors, as will be explained further down. Only the inhomogeneous blocks are subdivided further at the next level up. Blocks which are still inhomogeneous even after reaching the maximum subdivision level are categorized as non-classifiable. The result of the splitting stage is typically an over-segmented frame that must be post-processed at the combining, or merging, stage by combining some of the blocks of an over-segmented frame.

To this end, at the merging stage, homogeneous blocks are compared in pairs and are combined into a cluster if there is sufficient similarity. FIG. 2 shows an example of a segmented single frame after the splitting stage and after the merging stage. Regions considered as non-classifiable are marked by a black edge, whereas the classified regions are marked by non-black edges.

It is obvious that the number of homogeneous regions has clearly gone down due to the downstream merging stage.

The similarity assessment performed between two blocks is based on two MPEG-7 descriptors (cf. ISO/IEC JTC1/SC29/WG11/N4358: "Text of ISO/IEC 15938-3/FDIS Informationstechnology—Multimedia content description interface—Part 3 Visual", Sydney, Australia, July 2001: ISO/IEC JTC1/SC29/WG11/N4362: "MPEG-7 Visual part of experimentation Model Version 11.0", Sydney, Australia, July 2001). What we are dealing with here is, on the one hand, the "Edge Histogram" texture descriptor (EH) representing the spatial distribution of four directional edges (one horizontal, one vertical and two diagonal ones) and a non-directional edge for 16 local, non-overlapping regions of a frame. The frequency of occurrence of the individual edge classes is determined separately for each local region. The EH feature vector thus exhibits a dimension of 80 (16 regions times five edge classes). The second MPEG-7 descriptor used is the "SCalable Color" descriptor (SCC). It represents a color histogram in the HSV color space, HSV representing a three-dimensional color space having the components of hue, saturation, and value. The SCC feature vector used exhibits a dimension of 256.

Two blocks are classified as being similar if the distance between the respective feature vectors falls short of a predefined threshold value. The threshold value refers to the maximum distance possible. The latter depends on the metric ($1_1$, $1_2$, EMD) selected and on the current MPEG-7 descriptor (SCC or EH). The threshold value of zero indicates that two blocks can only be categorized as being similar in case of a hundred percent match of their feature vectors, whereas threshold value 1 means that any two blocks are always similar since the distance between their feature vectors cannot be larger than the largest distance possible. The similarity threshold value is set manually for each sequence and remains constant for the entire sequence.

The split and merge segmentation treats each frame independently of the other frames of a sequence. This results in inevitable temporal inconsistencies with regard to cross-frame texture recognition. Therefore, the identified texture areas of a current frame are matched with the texture areas of the preceding frames. In terms of the envisaged application it is important that the temporal consistency of recognizing identified textures is given for each Group of Frames (GoF) of the sequence considered. A GoF consists of two key frames (the first and last frames of a GoF) and several intervening, partially synthesized frames. Key frames are either I or P frames which are encoded based exclusively on MSE.

Temporal consistency of recognizing identified, detail-irrelevant textures of a GoF is ensured by means of a texture catalogue. In this texture catalogue, the detail-irrelevant textures present in the sequence considered are stored. The texture catalogue is initialized with the feature vectors of the detail-irrelevant textures which occur in the first frame that has detail-irrelevant textures. The identified textures of the following frames are compared with the entries made in the texture catalogue and are assigned to the respective entry if there is a match. In the event of an insufficient match, the unregistered, detail-irrelevant textures concerned are entered into the texture catalogue.

The reliability of the color and/or texture-based identification of synthesized texture areas of a GoF may be increased by adjusting the detail-irrelevant texture areas in the partially synthesized frames to the corresponding texture areas in the key frames by suitable warping. The detail-irrelevant texture areas of a frame are therefore warped in the direction of the corresponding key frames (first and last frames in the GoF). The warping is performed by means of the planar perspective motion model, as defined by MPEG-7 Parametric Motion Descriptor (cf. ISO/IEC JTC1/SC29/WG11/N4358: "Text of ISO/IEC 15938-3/FDIS Informationstechnology—Multimedia content description interface—Part 3 Visual", Sydney, Australia, July 2001; ISO/IEC JTC1/SC29/WG11/N4362: "MPEG-7 Visual part of experimentation Model Version 11.0", Sydney, Australia, July 2001). The perspective motion model is described by the following equations:

$$x'=[(a_1+a_3x+a_4y)/(1+a_7x+a_8y)]+x$$

$$y'=[(a_2+a_5x+a_6y)/(1+a_7x+a_8y)]+y$$

The coordinates (x', y') represent the transformed coordinates of the starting point (x, y). The eight model parameters are described by $a_1, \ldots, a_8$. The planar perspective model may describe random movements of random rigid bodies if the camera operations are limited to mere rotation and zoom. With planar rigid bodies, random camera operations are admissible. In practice, these conditions are typically met for the short period of a GoF. The motion parameters ($a_1, \ldots, a_8$) of the identified detail-irrelevant texture areas with regard to corresponding texture areas of the respective key frames are estimated, as is set forth in (cf. A. Smolic and J.-R. Ohm: "Robust Global Motion Estimation Using a Simplified M-Estimator Approach", Proc. ICIP2000, IEEE International Conference on Frame Processing, Vancouver, Canada, September 2000). Warping may only be performed if respective texture areas are present and/or are identified in the first or last frames of the GoF. Only those points of the transformed texture area which lie within the corresponding texture area of the first frame of the GoF can be used for synthesis. The remaining points are marked as non-classifiable in the current frame, whereby the synthesizable texture area is reduced in size. This method is repeated with the last frame of the GoF. Thus, the texture analyzer provides two reduced motion-compensated texture areas for each originally identified texture region (downstream from the merging stage) of a partially synthesizable frame.

Decoder-Side Texture Synthesis

The texture synthesizer used warps the texture of the first or last frames of the current GoF in the direction of the respective synthesizable texture region identified by the texture analyzer (FIG. 3). To this end, a motion parameter set and a control parameter are required for each synthesizable texture region identified by the texture analyzer. The control parameter determines whether the first or the last frames of a GoF are used for texture synthesis. In each case, use is made of that reference frame which results in the best texture synthesis. The better texture synthesis is characterized by a smaller differential signal between the synthesized and the original texture regions. This texture synthesizer provides very good results for rigid bodies, provided that the assumptions of the motion model are met.

In an exemplary embodiment, the methods described for analyzing and synthesizing textures have been integrated into an H.264/AVC codec (Joint Model 2.1). In the process, I and P frames are encoded on an MSE basis and used as key frames. However, B frames may be partially synthesized. For B frames comprising identified, synthesizable texture areas, a segmentation mask, a motion parameter set as well as a control parameter are to be transferred as side information per texture region.

When decoding, all macroblocks belonging to a synthesizable texture are treated as skipped macroblocks, i.e. all parameters and variables (in an order of decoding) required for decoding subsequent macroblocks within the slice are set as specified for skipped macroblocks (cf. DRAFT ISO/IEC 14496-10:2002 (E), Document JVT-E146d37: "Editor's Proposed Draft Text Modifications for Joint Video Specification (ITU-T Rec. H264|ISO/IEC 14496-10 AVC), Geneva modifications draft 36", Geneva, Switzerland, October 2002).

Once all macroblocks of a frame have been decoded, the texture synthesizer calls for filling the texture areas to be synthesized.

The experiment conducted was to integrate a texture analyzer and a texture synthesizer into an H.264/AVC video codec (Joint Model 2.1) and to subsequently code and decode video sequences. To this end, two known test sequences ("Flowergarden" and "Concrete") were used. Both test sequences contain textures well suited to demonstrate that a coarse reconstruction of certain textures may be performed without any noticeable visual quality loss.

In one embodiment of the invention, the H.264/AVC codec was set as follows:
  3 B frames,
  1 reference frame,
  CABAC (entropy encoding method),
  rate distortion optimization,
  no interlace,
  30 Hz frame frequency,
  quantization parameter (QP=16, 20, 24, 28 and 32) (FIG. 5).

For the "Flowergarden" sequence, the results exhibited satisfactory subjective image quality. FIG. 4 shows the results achieved using the example of the 6$^{th}$ frame of the "Flowergarden" sequence. FIG. 4c shows that the differential signal is almost zero in the sky area, whereas it is clearly higher in the flower area. But still, in an optical comparison between the decoded and the original frames, as good as no differences are seen. This shows that the PSNR value is not suitable as a measure of quality for this type of encoding.

To be able to estimate the maximum bitrate saving possible, both test sequences were manually segmented for the first tests. Further tests with semiautomatically generated segmentation masks followed (cf. the above section "encoder-side texture analysis").

FIG. 5 shows the bitrate savings, obtained for both test sequences, in dependence on the quantization parameter (QP). The largest savings were measured to occur for the highest quantization resolution (QP=16). Savings of 20.29% ("Flowergarden") and 23.05% (Concrete) could be measured for this resolution with hand-segmented masks.

With semiautomatically generated masks, we obtained savings of 5.6% ("Flowergarden") and 18.53% (Concrete) for QP=16. The bitrate savings decrease with a decreasing quantization resolution and/or with an increasing QP value. This is due to the fact that the side information transmitted remains constant independently of QP. This means that the proportion of the side information in the overall bitrate increases with the quantization resolution becoming more and more coarse. With quantization parameters larger than 28 and 32, respectively, (FIG. 5), the bitrates of the H.264/AVC video codec standard are about the same as or even smaller than those of the codec with texture analysis and synthesis.

The overlapping of the "Concrete" curves (FIG. 5) is based on the fact that the number of textures detected was smaller, seen across the entire sequence, with semiautomatic segmentation than with manual segmentation, so that the side information that had to be transmitted was less with the semiautomatic segmentation than with the manual one. Therefore, the volume of the side information was smaller in the semiautomatic case than in the manual case. The subjective image quality of the H.264/AVC-video encoded and decoded frame sequences was comparable, for all QP settings, with the results of the encoding with texture analysis and synthesis (cf. http://bs.hhi.de/~ndjiki/SE.htm)

In its implementation, the invention is not limited to the preferred embodiments indicated above. Rather, a number of variants are feasible which utilize the inventive assembly and method even with implementations of principally different types.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for video encoding, comprising:
  performing a texture analysis of video scenes to identify areas of synthesizable textures;
  encoding the video scenes and generating meta data for describing the areas identified and for describing the synthesizable textures using information on identified areas of synthesizable textures, and information on the textures of these areas; and
  ensuring temporal consistency of recognizing synthesizable textures in a sequence of frames by means of a texture catalogue, by
    storing the synthesizable textures of the identified areas of synthesizable textures in a first frame of the sequence in the texture catalogue in order to initialize same;
    comparing the synthesizable textures of the identified areas of synthesizable textures in the following frames of the sequence with the synthesizable textures stored in the texture catalogue;
    in the event of a match, assigning the respective synthesizable texture of an identified area of synthesizable texture among the following frames of the sequence to the respective synthesizable texture stored in the texture catalogue; and
    in the event of no match, storing the respective synthesizable texture of an identified area of synthesizable texture among the following frames of the sequence in the texture catalogue.

2. The method as claimed in claim 1, wherein performing the texture analysis comprises subdividing frames into blocks using a multi-resolution quadtree.

3. The method as claimed in claim 2, wherein the subdividing of a block is broken off if
the blocks resulting from the next subdivision step exhibit similar color and/or texture properties as this block, or
the sizes of blocks of the next subdivision step fall short of a predefined value.

4. The method as claimed in claim 3, wherein blocks, the subdividing of which has been broken off because of similar color and/or texture properties, are marked as homogeneous blocks, and the blocks which differ from the homogeneous blocks once the subdividing of the frame has been completed, are marked as non-classifiable blocks.

5. The method as claimed in claim 3, wherein after the subdivision of a frame, a similarity assessment is performed for those blocks whose subdivision was broken off because of similar color and/or texture properties, and wherein similar blocks are combined into synthesizable areas.

6. The method as claimed in claim 5, wherein the similarity of blocks is assessed on the basis of MPEG-7 descriptors.

7. The method as claimed in claim 6, wherein the similarity of blocks is assessed on the basis of the MPEG-7 descriptors "Edge Histogram" texture descriptor (EH) and/or "SCalable Color" descriptor (SCC).

8. The method as claimed in claim 1, wherein the identified areas of synthesizable textures of a frame of a video sequence are matched with areas of synthesizable textures of preceding frames of the video sequence.

9. The method as claimed in claim 1, wherein the first and last frames (the so-called key frames) of a "Group of Frames" (GoF) are encoded on the basis of a mean squared error method (MSE based), and intervening B frames comprising identified synthesizable areas are partially synthesized.

10. The method as claimed in claim 1, wherein synthesizable areas in the partially synthesized frames are adapted to corresponding texture areas in the key frames by suitable warping.

11. The method as claimed in claim 10, wherein the warping is performed by means of a planar perspective motion model described by the following equations:

$$x'=[(a_1+a_3 x+a_4 y)/(1+a_7 x+e_8 y)]+x,$$

$$y'=[(a_2+a_5 x+a_6 y)/(1+a_7 x+e_8 y)]+y,$$

wherein
(x, y) represent the coordinates of the starting point,
(x', y') represent the transformed coordinates of the starting point, and
$a_1, \ldots, a_8$ represent model parameters.

12. The method as claimed in claim 10, wherein the warping causes the texture of the first or last frames of the current GoF to be warped in the direction of the synthesizable texture area identified, wherein each such texture area is associated a motion parameter set and a control parameter, the control parameter indicating whether the first or last frame of a GoF is used for texture synthesis.

13. The method as claimed in claim 12, wherein for texture synthesis, that frame of a GoF is used for which a smaller differential signal is determined between the synthesized and the original texture regions.

14. The method as claimed in claim 1, wherein the following are generated per texture area as meta data of areas with synthesizable textures:
a segmentation mask,
a motion parameter set, and/or
a control parameter.

15. The method as claimed in claim 1, further comprising, at the decoder side, the steps of assessing the encoded data and meta data, and reconstructing the video scenes by synthetically generating textures for areas identified by assessing the meta data.

16. An apparatus for video encoding, comprising:
an analyzer for performing a texture analysis of video scenes to identify areas of synthesizable textures;
an encoder for encoding the video scenes and a generator for generating meta data for describing the areas identified and for describing the synthesizable textures using information on identified areas of synthesizable textures, and information on the textures of these areas; and
a unit for ensuring temporal consistency of recognizing synthesizable textures in a sequence of frames by means of a texture catalogue, by
storing the synthesizable textures of the identified areas of synthesizable textures in a first frame of the sequence in the texture catalogue in order to initialize same;
comparing the synthesizable textures of the identified areas of synthesizable textures in the following frames of the sequence with the synthesizable textures stored in the texture catalogue;
in the event of a match, assigning the respective synthesizable texture of an identified area of synthesizable texture among the following frames of the sequence to the respective synthesizable texture stored in the texture catalogue; and
in the event of no match, storing the respective synthesizable texture of an identified area of synthesizable texture among the following frames of the sequence in the texture catalogue.

17. A computer program enabling a computer, once it has been loaded into the computer's memory, to perform a method as claimed in claim 1.

18. A computer-readable storage medium having a program stored thereon which enables the computer, once it has been loaded into the computer's memory, to perform a method as claimed in claim 1.

19. A method for video encoding, comprising:
performing a texture analysis of video scenes to identify areas of synthesizable textures;
encoding the video scenes and generating meta data for describing the areas identified and for describing the synthesizable textures using information on identified areas of synthesizable textures, and information on the textures of these areas,
the step of generating the meta data comprising the step of estimating motion parameters describing a warping so as to adapt synthesizable areas in frames of a Group of Frames to corresponding texture areas in first or last frames of this group by means of the warping, the motion parameters being part of the meta data.

20. The method as claimed in claim 19, wherein performing the texture analysis comprises subdividing frames into blocks using a multi-resolution quadtree.

21. The method as claimed in claim 20, wherein the subdividing of a block is broken off if
the blocks resulting from the next subdivision step exhibit similar color and/or texture properties as this block, or
the sizes of blocks of the next subdivision step fall short of a predefined value.

22. The method as claimed in claim 21, wherein blocks, the subdividing of which has been broken off because of similar color and/or texture properties, are marked as homogeneous blocks, and the blocks which differ from the homogeneous blocks once the subdividing of the frame has been completed, are marked as non-classifiable blocks.

23. The method as claimed in claim 21, wherein after the subdivision of a frame, a similarity assessment is performed for those blocks whose subdivision was broken off because of similar color and/or texture properties, and wherein similar blocks are combined into synthesizable areas.

24. The method as claimed in claim 23, wherein the similarity of blocks is assessed on the basis of MPEG-7 descriptors.

25. The method as claimed in claim 24, wherein the similarity of blocks is assessed on the basis of the MPEG-7 descriptors "Edge Histogram" texture descriptor (EH) and/or "SCalable Color" descriptor (SCC).

26. The method as claimed in claim 19, wherein the identified areas of synthesizable textures of a frame of a video sequence are matched with areas of synthesizable textures of preceding frames of the video sequence.

27. The method as claimed in claim 19, wherein the first and last frames (the so-called key frames) of a "Group of Frames" (GoF) are encoded on the basis of a mean squared error method (MSE based), and intervening B frames comprising identified synthesizable areas are partially synthesized.

28. The method as claimed in claim 27, wherein the temporal consistency of recognizing synthesizable textures of a Group of Frames (GoF) is ensured by means of a texture catalogue.

29. The method as claimed in claim 19, wherein the warping is performed by means of a planar perspective motion model described by the following equations:

$$x'=[(a_1+a_3x+a_4y)/(1+a_7x+a_8y)]+x,$$

$$y'=[(a_2+a_5x+a_6y)/(1+a_7x+a_8y)]+y,$$

wherein
(x, y) represent the coordinates of the starting point,
(x', y') represent the transformed coordinates of the starting point, and
$a_1, \ldots, a_8$ represent model parameters.

30. The method as claimed in claim 29, wherein the warping causes the texture of the first or last frames of the current GoF to be warped in the direction of the synthesizable texture area identified, wherein each such texture area is associated a motion parameter set and a control parameter, the control parameter indicating whether the first or last frame of a GoF is used for texture synthesis.

31. The method as claimed in claim 30, wherein for texture synthesis, that frame of a GoF is used for which a smaller differential signal is determined between the synthesized and the original texture regions.

32. The method as claimed in claim 19, wherein the following are generated per texture area as meta data of areas with synthesizable textures:
a segmentation mask,
a motion parameter set, and/or
a control parameter.

33. A method for video decoding, comprising:
assessing encoded data of video scenes and meta data for describing identified areas of synthesizable textures in the video scenes and for describing the synthesizable textures of these areas; and
reconstructing the video scenes by synthetically generating synthetically generated textures for the areas identified, wherein the meta data comprise motion parameters describing a warping so as to adapt synthesizable areas in frames of a Group of Frames to corresponding texture areas in first or last frames of this group by means of the warping, and
wherein the step of reconstructing comprises the step of warping the corresponding texture areas in the first or last frames of the group in the direction of the adapted synthesizable areas in the frames of the Group of Frames using the motion parameters.

34. An assembly for video encoding, comprising:
an analyzer for performing a texture analysis of video scenes to identify areas of synthesizable textures;
an encoder for encoding the video scenes and a generator for generating meta data for describing the areas identified and for describing the synthesizable textures using information on identified areas of synthesizable textures, and information on the textures of these areas; and
the generator for generating the meta data being configured to estimate motion parameters describing a warping so as to adapt synthesizable areas in frames of a Group of Frames to corresponding texture areas in first or last frames of this group by means of the warping, the motion parameters being part of the meta data.

35. An assembly for video decoding, comprising:
an assessor for assessing encoded data of video scenes and meta data for describing identified areas of synthesizable textures in the video scenes and for describing the synthesizable textures of these areas; and
a reconstructor for reconstructing the video scenes by synthetically generating synthetically generated textures for the areas identified,
wherein the meta data comprise motion parameters describing a warping so as to adapt synthesizable areas in frames of a Group of Frames to corresponding texture areas in first or last frames of this group by means of the warping, and
wherein the reconstructor is configured to warp the corresponding texture areas in the first or last frames of the group in the direction of the adapted synthesizable areas in the frames of the Group of Frames using the motion parameters.

36. A computer program enabling a computer, once it has been loaded into the computer's memory, to perform a method as claimed in claim 19.

37. A computer program enabling a computer, once it has been loaded into the computer's memory, to perform a method as claimed in claim 33.

38. A computer-readable storage medium having a program stored thereon which enables the computer, once it has been loaded into the computer's memory, to perform a method as claimed in claim 19.

39. A computer-readable storage medium having a program stored thereon which enables the computer, once it has been loaded into the computer's memory, to perform a method as claimed in claim 33.

40. The method as claimed in claim 33, wherein the first and last frames (the so-called key frames) of a "Group of Frames" (GoF) are encoded into the encoded data on the basis of a mean squared error method (MSE based), and intervening frames between the first and last frames of the GoF comprise B frames comprising the identified areas of synthesizable textures, and the method comprises decoding the frames of the GoF.

41. The method as claimed in claim 33, wherein the warping is performed by means of a planar perspective motion model described by the following equations:

$$x'=[(a_1+a_3x+a_4y)/(1+a_7x+a_8y)]+x,$$

$$y'=[(a_2+a_5x+a_6y)/(1+a_7x+a_8y)]+y,$$

wherein (x, y) represent the coordinates of the starting point, (x', y') represent the transformed coordinates of the starting point, and $a_1, \ldots, a_8$ represent model parameters comprised by the motion parameters.

42. The method as claimed in claim 33, wherein the warping is performed groups-of-frames-wise by causing the texture of first or last frames of a current GoF to be warped into the direction of the identified areas of synthesizable texture in a frame of the current GoF between the first and last frames, wherein the reconstruction comprises checking a control parameter within the meta data to decide as to whether the first or last frame of the current GoF is to be used for texture synthesis.

43. The assembly as claimed in claim 35, wherein the first and last frames (the so-called key frames) of a "Group of Frames" (GoF) are encoded into the encoded data on the basis of a mean squared error method (MSE based), and intervening frames between the first and last frames of the GoF comprise B frames comprising the identified areas of synthesizable textures, and the assembly comprises a decoder configured to decode the frames of the GoF.

44. The assembly as claimed in claim 35, wherein the reconstructor is configured to perform the warping by means of a planar perspective motion model described by the following equations:

$$x'=[(a_1+a_3x+a_4y)/(1+a_7x+a_8y)]+x,$$

$$y'=[(a_2+a_5x+a_6y)/(1+a_7x+a_8y)]+y,$$

wherein (x, y) represent the coordinates of the starting point, (x', y') represent the transformed coordinates of the starting point, and $a_1, \ldots, a_8$ represent model parameters comprised by the motion parameters.

45. The assembly as claimed in claim 35, wherein the reconstructor is configured to perform the warping groups-of-frames-wise by causing the texture of first or last frames of a current GoF to be warped into the direction of the identified areas of synthesizable texture in a frame of the current GoF between the first and last frames, wherein the reconstructor is configured to check a control parameter within the meta data to decide as to whether the first or last frame of the current GoF is to be used for texture synthesis.

* * * * *